(12) United States Patent
McNutt

(10) Patent No.: US 6,341,331 B1
(45) Date of Patent: Jan. 22, 2002

(54) METHOD AND SYSTEM FOR MANAGING A RAID STORAGE SYSTEM WITH CACHE

(75) Inventor: Bruce McNutt, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/410,499

(22) Filed: Oct. 1, 1999

(51) Int. Cl.$^7$ ............................................... G06F 12/00
(52) U.S. Cl. ...................... 711/113; 711/129; 711/136
(58) Field of Search ............................. 711/122, 132, 711/136, 113, 129, 114

(56) References Cited

U.S. PATENT DOCUMENTS

| | | | | |
|---|---|---|---|---|
| 5,155,828 A | * | 10/1992 | La Fetra et al. | 395/425 |
| 5,155,832 A | * | 10/1992 | Hunt | 395/425 |
| 5,210,848 A | | 5/1993 | Liu | 395/425 |
| 5,293,609 A | * | 3/1994 | Shih et al. | 395/425 |
| 5,434,992 A | * | 7/1995 | Mattson | 395/425 |
| 5,485,598 A | * | 1/1996 | Kashima et al. | 395/182.04 |
| 5,572,704 A | | 11/1996 | Bratt et al. | 395/488 |
| 5,615,352 A | * | 3/1997 | Jacobson et al. | 395/441 |
| 5,627,990 A | | 5/1997 | Cord et al. | 395/449 |
| 5,634,109 A | * | 5/1997 | Chen et al. | 395/470 |
| 5,636,359 A | | 6/1997 | Beardsley et al. | 395/449 |
| 5,717,893 A | | 2/1998 | Mattson | 395/456 |
| 5,778,426 A | | 7/1998 | DeKoning et al. | 711/122 |
| 5,802,572 A | | 9/1998 | Patel et al. | 711/143 |
| 5,933,840 A | * | 8/1999 | Menon et al. | 707/206 |

FOREIGN PATENT DOCUMENTS

| | | | | |
|---|---|---|---|---|
| EP | 0509231 A1 | * | 10/1992 | G06F/12/12 |
| GB | 2037037 | | 7/1980 | G06F/13/00 |

* cited by examiner

Primary Examiner—Matthew Kim
Assistant Examiner—Stephan Elmore
(74) Attorney, Agent, or Firm—Ohlandt, Greeley, Ruggiero & Perle, LLP; Randall J. Bluestone, Esq.

(57) ABSTRACT

A computer system has a host computer that runs applications that require data objects from a storage system. The storage system has a storage device, such as a disk storage device, and a cache memory. Data objects that are frequently used by the host computer are stored in the cache memory. The data objects are also stored in the storage device logically arranged in segments of data objects, and groups of segments. The cache memory is logically partitioned into a segment cache and a group cache. Data of a small granular nature namely segments, are stored in the segment cache. Data of a larger granular nature, namely groups, is stored in the group cache. When the host computer requests accesses to read or write data objects, groups of segments are staged or destaged between the storage device and the group cache, with at least one segment of each staged group containing one of the requested data objects.

21 Claims, 3 Drawing Sheets

METHOD AND SYSTEM FOR MANAGING A RAID STORAGE SYSTEM WITH CACHE

FIELD OF THE INVENTION

This invention relates to storage systems that have a direct access storage device, such as a disk memory, and a cache memory. In particular, the invention relates to a method and a system that provides enhanced performance by reducing host computer and channel wait times for data accesses to the storage system.

BACKGROUND OF THE INVENTION

A typical computer system includes a host computer and a direct access storage device (DASD), such as one or more magnetic disks. Applications running on the host computer access address locations in the DASD for reading and writing data. Such an access is known as a disk input/output (I/O) operation. The host computer operates at a much higher speed than the DASD such that I/O disk operations cause the running application to wait for the I/O operations to be completed. The result is that the host computer throughput is impeded. To avoid this, a separate high speed cache memory is employed to store data that is most frequently used by the application.

A storage system manager is used to control the I/O disk operations and accessing of the cache memory. Generally, the data is organized into data objects, such as records. When a running application requests a record, the storage system manager first looks for the record in the cache memory. If the requested record is found in the cache memory (i. e., "a hit"), it is quickly accessed and there is no need to perform a time consuming disk I/O operation. If the requested record is not found in the cache memory (i. e., "a miss"), then the storage system manager needs to perform a disk I/O operation to obtain the requested record from the DASD and to write the requested record to the cache memory.

Typically, the storage system manager manages record retention in the cache memory by a least recently used (LRU) technique. The LRU technique uses a chain or queue of control blocks. Each control block identifies (a) the address of a record, (b) a forward chain pointer that identifies the address of the next consecutive record in the chain and (c) a backward pointer that identifies the address of the preceding record in the chain. The storage system manager maintains a first anchor pointer that identifies the LRU record, e. g., the top end of the chain. The storage system manager also maintains a second anchor pointer that identifies the most recently used (MRU) record, e. g., the bottom end of the chain.

Each time a cache hit occurs, the control block for the hit record is dequeued and then enqueued as the MRU record at the bottom end of the LRU chain. Each time a cache miss occurs, the LRU control block is dequeued from the top end of the chain. The newly requested record is staged from DASD to an allocated address in the cache memory. The dequeued control block is updated with the identities of the staged record and the allocated address and enqueued at the bottom of the LRU chain as the MRU control block.

In the design of cache memories for storage systems, much attention is given to increasing the probability that requested data records will be found in the cache memory. For example, U.S. Pat. No. 5,717,893 discloses a cache memory that is partitioned into a global cache and a plurality of destaging local caches, with each local cache being allocated to storing data records of a specific type. Data records of all types are destaged to the global cache from the local caches or from the disk storage system. In accordance with an LRU algorithm, an LRU data record is demoted from the global cache to the local cache whose data type matches the data type of the demoted LRU record. When a local cache is full, an LRU record is destaged to the storage system. The cache hit rate is increased because the partitioning scheme can be designed to allocate more cache to data record types that are more frequently used. There is also a feature that permits logical and dynamic resizing of the partitions so that cache can be increased for more frequently used data types and concomitantly decreased for less frequently used data types.

Other prior art schemes increase the cache hit rate by eliminating data record duplications in cache. Typical schemes of this type are disclosed in U.S. Pat. Nos. 5,802,572 and 5,627,990.

DASD systems have been improved with the use of multiple small storage modules configured in geometries that assure data recovery in the event of a failure. These improved systems are frequently referred to as redundant arrays of inexpensive (or independent) disks (RAID). In some of these geometries, a data object is partitioned into data portions and each data portion is stored on a different one of the disks. In one geometry, known as RAID level 4, one of the disks is dedicated to storing parity for the data portions. The parity is used to reconstruct the data portion in the event of a failure. For write operations, this geometry requires two separate write accesses, one access to the disk upon which the data portion is stored and another access to the disk upon which the parity is stored.

In another geometry, known as RAID level 5, the disks are partitioned to distribute the data and parity information across the active disks in the array. Each partition is commonly referred to as a stripe. The parity information for a stripe is usually placed on one disk and the data is placed on the remaining disks of the stripe. The disk that contains parity information varies from stripe to stripe. This allows multiple stripes to be manipulated in parallel, thereby enabling rather large chunks of data to be staged or destaged.

The aforementioned schemes for increasing the cache hit rate are concerned with rather small data objects, such as a page, a table or the like. They do not take advantage of the ability of a RAID system to handle much larger objects of data, such as a stripe, that contains a large number of the smaller page objects.

Accordingly, there is a need for a cache memory that has an improved probability of cache hits. Especially, there is a need for a cache memory that takes advantage of the stripe accessing capabilities of a RAID storage device.

SUMMARY OF THE INVENTION

The present invention employs a host computer that runs applications that require data objects from a storage system. The storage system has a storage device, such as a disk storage device, and a cache memory. Data objects that are frequently used by the host computer are stored in the cache memory. The data objects are also stored in the storage device logically arranged in segments of data objects and groups of segments. The cache memory is logically partitioned into a first cache and a second cache.

The method of the present invention uses the first cache for storage of segments that have a small granularity and the second cache for storage of groups of segments that have a large granularity. When the host computer requests access to data, the method of the invention determines if the requested data is stored in the first cache. If the requested data is not stored in the first cache, the method determines if the requested data is stored in the second cache. If the requested data is not stored in the second cache, a group of segments stored in the storage device is accessed, the requested data being contained in one of these segments. The group of segments is then stored in the second cache and the first segment that includes the requested data is stored in the first cache. The requested data is then accessed from the first cache.

If the method determines that the requested data is stored in the second cache, but not in the first cache, a copy of the segment containing requested data is transferred to the first cache.

The method uses separate LRU procedures to control destaging of least recently used segments from the first cache and groups of segments from the second cache to allocate storage for requested data that is not stored in the first and second caches.

The logical partitioning of the cache memory into a first cache and a second cache together with storing segments in the first cache and groups in the second cache is an important feature of the present invention. This feature takes advantage of the likelihood that an application that requests a data object in a group will also need other data objects in the same group, but not necessarily in the same segment.

The cache memory system of the present invention employs a multi-granular cache manager program that includes the procedure of the method of the invention described above.

The memory medium according to the present invention controls a cache memory to perform the procedure of the method of the invention described above.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF PREFERRED EMBODIMENT

Figure 1:
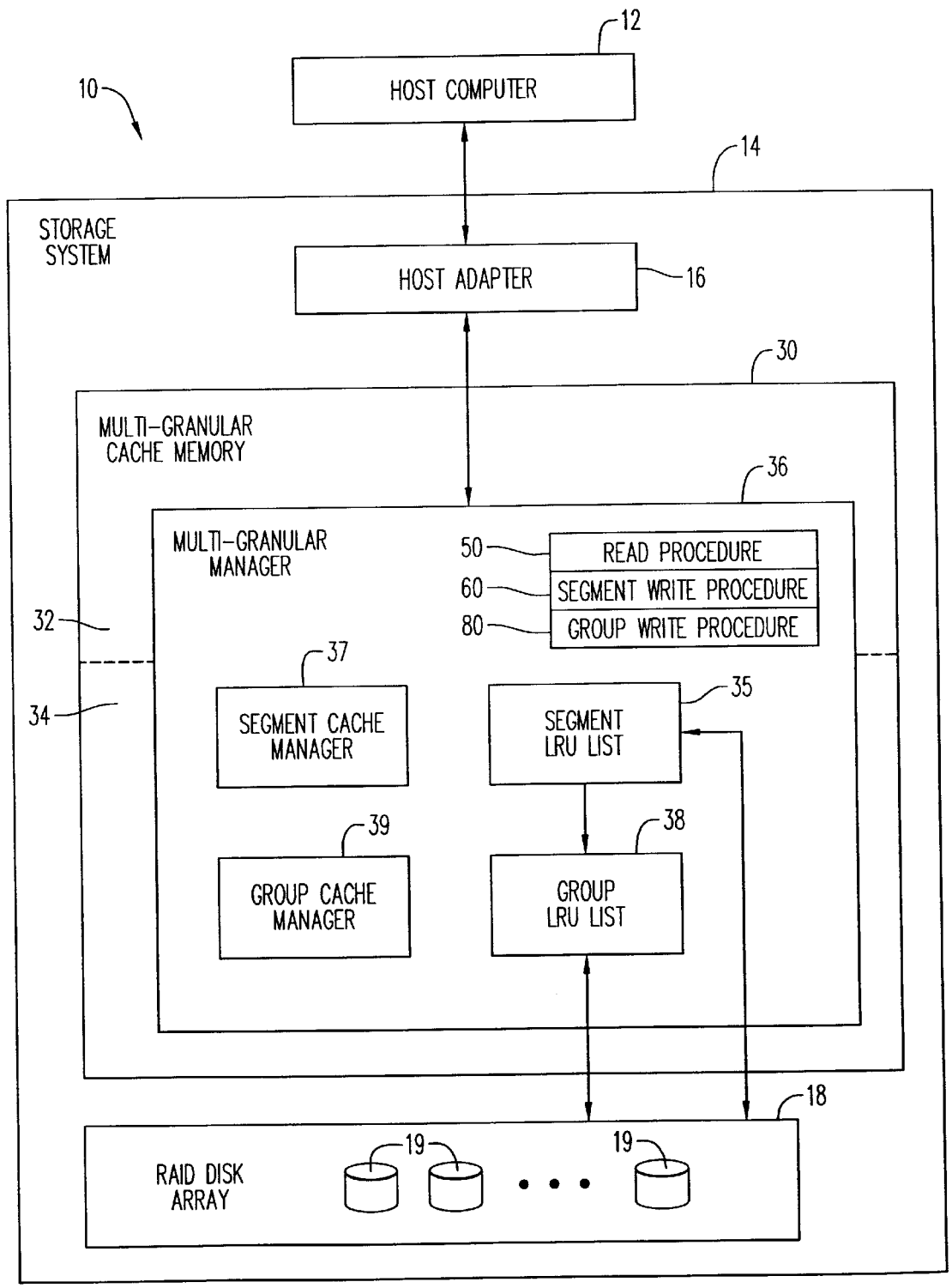
FIG. 1 is a block diagram of a computer system that includes a multi-granular cache memory according to the present invention.

With reference to FIG. 1, there is provided a computer system 10. Computer system 10 includes a host computer 12 and a storage system 14. Storage system 14 includes a host adapter 16, a storage device 18 and a multi-granular cache memory 30 according to the present invention. Multi-granular cache memory 30 together with host adapter 16 is coupled in a data path between host computer 12 and storage device 18.

Host computer 12 typically includes one or more processors that run applications. The processors may run a single application in parallel or separate applications at different times or concurrently, or any combination thereof. The applications use data objects that constitute logical data structures. A logical data structure may typically be a record such as a page, a table or the like. For storage purposes, a plurality of data objects are arranged logically in a segment and a plurality of segments are arranged logically in a group.

In the preferred embodiment for a RAID-5 array, a group corresponds to a stripe (also, sometimes known in the art as an array cylinder) and a segment corresponds to one disk of a stripe (also, sometimes known in the art as an array track). The present invention contemplates that logical data structures of object, segment and group may, however, be defined in a flexible manner. Also, those skilled in the art will recognize that alternative physical layouts corresponding to these logical data structures are possible.

Host adapter 16 may suitably be a conventional facility that has sending and receiving capability for exchanging data records between storage system 14 and host computer 12.

Storage device 18 may suitably be a disk storage device that has a plurality of disks 19. Preferably, storage device 18 uses disks 19 in a RAID storage scheme so that the multi-granular cache memory 30 can take advantage of the RAID capability to manipulate rather large chunks (one or more cylinders) of data concurrently.

In accordance with the present invention, cache memory 30 includes a multi-granular manager 36. According to the method of the invention, manager 36 logically partitions cache memory 30 into a first cache 32 and a second cache 34. Manager 36 responds to data access requests from host computer 12 to cause data structures of smaller granularity, such as segments to be stored in first cache 32. Manager 36 responds to data access requests from host computer 12 to cause data structures of a higher granularity, such as groups to be stored in second cache 34. First and second caches 32 and 34 may be designated physical areas of cache memory 30 or may be logical areas.

The logical partitioning of cache memory 30 into first cache 32 and second cache 34 together with storing segments in first cache 32 and groups in second cache 34 is an important feature of the present invention. It takes advantage of the likelihood that an application that requests a data object in a group will also need other data objects in the same group, but not necessarily in the same segment. It is expected that the cache miss ratio will be reduced by a factor of about four.

Manager 36 includes a segment LRU list 35 and a first cache manager 37 for managing segment LRU list 35 for first cache 32, utilizing a conventional LRU procedure. Manager 36 also includes a group LRU list 38 and a group manager 39 for managing group LRU list 38 for second cache 32, utilizing a conventional LRU procedure. Manager 36 further includes a read procedure 50, a segment write procedure 60 and a group write procedure 80.

Figure 2:
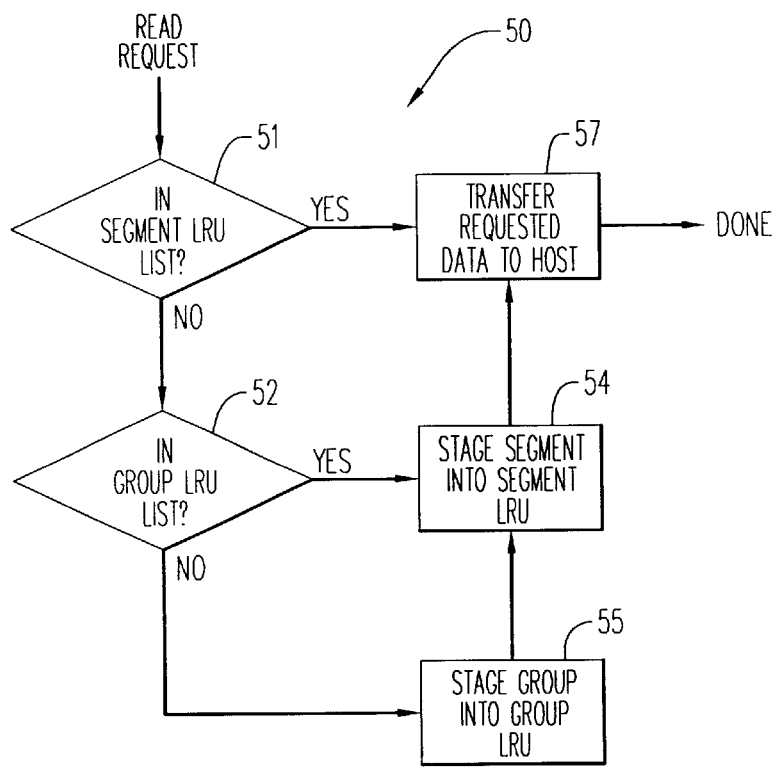
FIG. 2 is a flow diagram of the read procedure of a multi-granular program according to the present invention.

Referring to FIG. 2, read procedure 50 begins when host computer 12 requests a data access for a read operation. Step 51 determines if the requested data is in segment LRU list 35. If the requested data is in segment LRU list 35, step 57 transfers a copy of the requested data from first cache 32 to host computer 12.

If the requested data is not in segment LRU list 35 (a first cache miss), step 52 determines if the requested data is in group LRU list 38. If the requested data is in group LRU list 38, step 54 stages a copy of the segment that contains the requested data from second cache 34 to first cache 32. Step 54 also cooperates with first cache manager 37 to update segment LRU list 35 to include the address of such staged segment in its MRU position of the list. Step 57 then transfers a copy of the requested data to host computer 12.

If the requested data is not in group LRU list 38 (a second cache miss), step 55 stages a copy of a group that contains the requested data from disk storage device 18 to second cache 34. Step 55 also cooperates with second cache manager to update group LRU list 38 to include the address of such staged group in the MRU position of the list. Step 54 then stages the segment that contains the requested data from second cache 34 to first cache 32 as described above. Step 57 then transfers a copy of the requested record to host computer 12.

Figure 3:
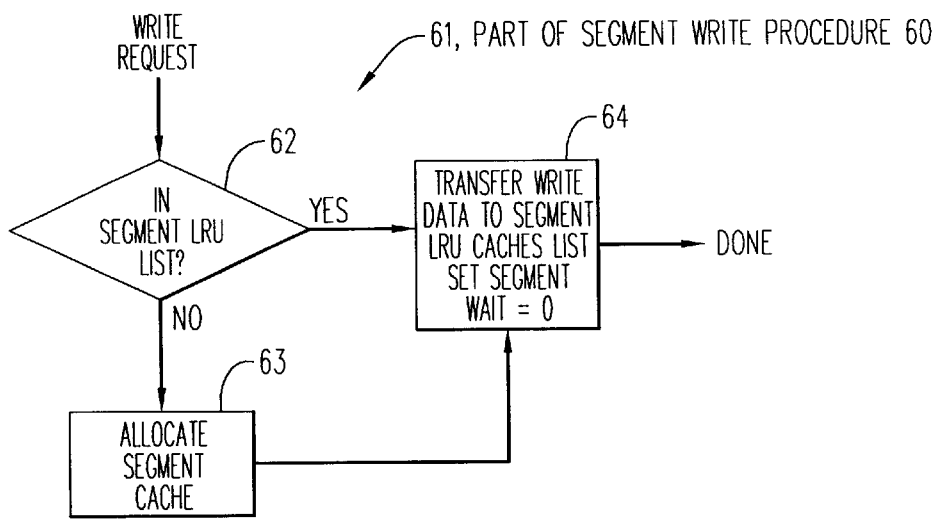
FIGS. 3 through 5 are flow diagrams that depict a write procedure of a multi-granular program according to the present invention.
Figure 4:
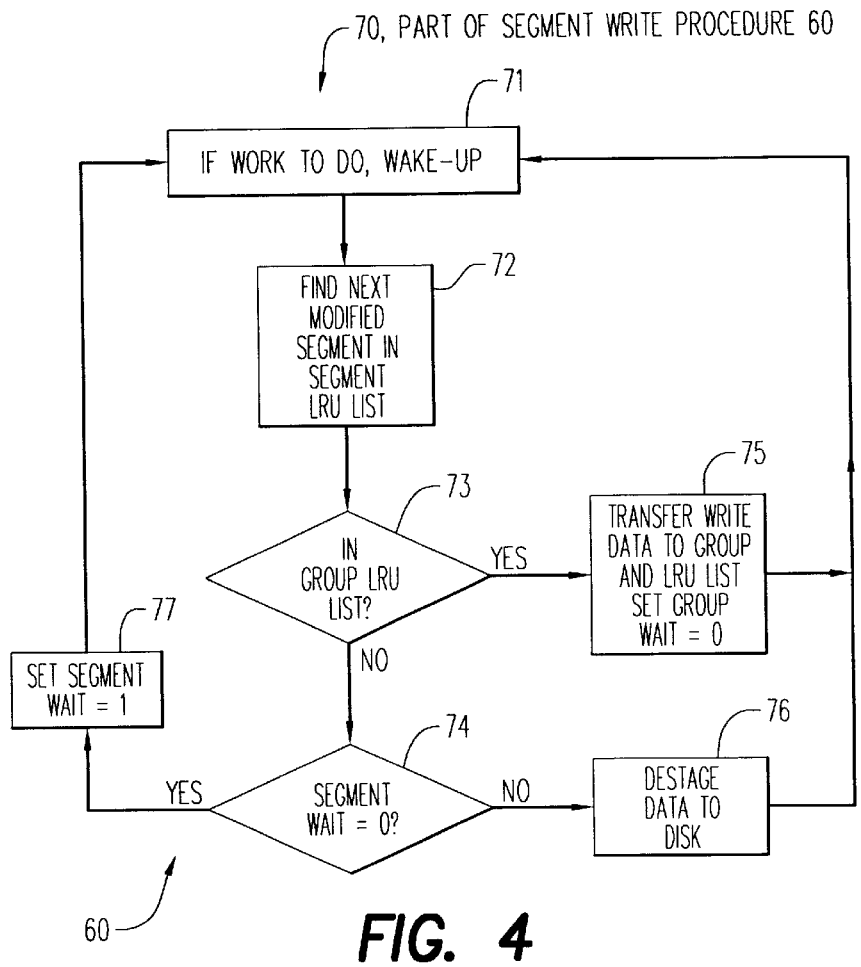

Referring to FIGS. 3 and 4, segment write procedure 60 includes a synchronous process 61 shown in FIG. 3 and an asynchronous process 70 shown in FIG. 4. Referring first to FIG. 3, synchronous process 61 begins when host computer 12 requests a data access for write operation. Step 62 determines if the requested data already exists in segment LRU list 35. If so, step 64 transfers the data to be written to segment LRU cache 32 so as to modify the existing data. Step 64 also updates segment LRU list 35. Step 64 also sets a segment wait flag for this segment to 0.

If step 62 determines that the requested data is not in segment LRU list 35, step 63 allocates a location in first cache 32. Step 64 is then performed as described above, except that the data to be written does not modify a pre-existing version.

Referring to FIG. 4, asynchronous process 70 is normally in sleep mode and is awakened by step 71 when there is a modified segment in first cache 32 that needs to be destaged to second cache 34 and/or to disk storage device 18. When step 71 determines that there is destaging work to be done, step 72 finds the next modified segment in segment LRU list 35. Step 73 determines if this segment is in group LRU list 38. If not, step 74 determines if the segment wait flag is set to 0. If so, step 77 sets the segment wait flag to 1. Asynchronous process 70 then either progresses to the next modified segment in segment LRU list 35, or enters the sleep mode for a short time if it has completed its current scan for work. This affords a wait feature that allows other modifications to the segment to be made before staging to disk storage device 18.

Step 71 then again awakens asynchronous process 70 and steps 72 through 74 are repeated. Step 74 will now determine that the segment wait flag is not set to 0. Step 76 will then destage the modified segment to disk storage device 18. Asynchronous process 70 then either progresses to the next modified segment in segment LRU list 35, or enters the sleep mode for a short time if it has completed its current scan for work.

If step 73 determines that the modified segment is in group LRU list 38, step 75 transfers the modified segment to second cache 34 so as to modify the existing group. Step 75 also updates group LRU list 38. Step 75 also sets a group wait flag for this group to 0. Asynchronous process 70 then enters its sleep mode.

Figure 5:
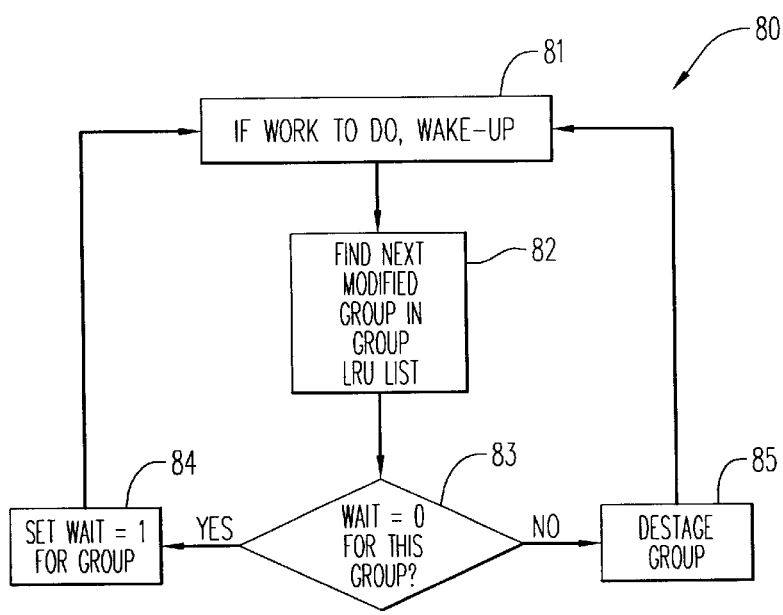

Referring to FIG. 5, group write procedure 80 is also an asynchronous process that awakens at step 81 when there is group destaging work to be done. When group write procedure 80 is awakened by step 81, step 82 finds the next modified group in group LRU list 38. Step 83 determines if the group wait flag is set to 0. If so, step 84 sets the group wait flag to 1. Group write procedure 80 then enters the sleep mode for a short time. This affords a wait feature that allows other modifications to the group to be made before staging to disk storage device 18.

Step 81 then again awakens group write procedure 80 and steps 82 and 83 are repeated. Step 83 will now determine that the group wait flag is not set to 0. Step 85 will then destage the modified group to disk storage device 18. Group write procedure 80 then enters the sleep mode.

The present invention having been thus described with particular reference to the preferred forms thereof, it will be obvious that various changes and modifications may be made therein without departing from the spirit and scope of the present invention as defined in the appended claims.

What is claimed is:

1. A method for managing a cache memory that is logically partitioned into first and second caches, said cache memory being located in a data path between a host computer and a storage device, said method comprising:

in response to a request from said host computer to access data, determining if said requested data is stored in said first cache and if said requested data is not stored in said first cache, determining if said requested data is stored in said second cache;

if said requested data is not stored in said second cache, accessing a group of segments stored in said storage device, a first segment included in said group of segments including said requested data;

storing said group of segments in said second cache and storing said first segment that includes said requested data in said first cache; and accessing said requested data from said first cache if in response to said request from said host computer to access data, it is determined that said requested data is stored in said first cache, or after storing said group of segments in said second cache and storing said first segment that includes said requested data in said first cache.

2. The method of claim 1, further comprising:

if in response to a request from said host computer to access data it is determined that the requested data is stored in said second cache but not in said first cache, accessing in said second cache a second segment that contains said requested data and storing said second segment in said first cache; and accessing said requested data from said first cache after storing said second segment in said first cache.

3. The method of claim 2, further comprising:

if in response to a request from said host computer to access data it is determined that the requested data is not stored in said first cache, destaging a least recently used segment from said first cache according to a least recently used procedure; and if in response to a request from said host computer to access data it is determined that the requested data is not stored in said second cache, destaging a least recently used group of said segments from said second cache according to a least recently used procedure.

4. The method of claim 3, further comprising:

maintaining a first least recently used list for said first cache that is used when destaging a least recently used segment from said first cache according to a least recently used procedure; and maintaining a second least recently used list for said second cache that is used when destaging a least recently used group of said segments from said second cache according to a least recently used procedure .

5. The method of claim 2, further comprising:

if said access request is a request to write a modified version of said requested data, transferring said modified version to said first cache; and transferring to said storage device a copy of said modified version from said first cache directly or indirectly via said second cache.

6. The method of claim 5, comprising transferring to said storage device a copy of said modified version from said first cache via said second cache directly if said requested data is not in said second cache and indirectly if said requested data is in said second cache.

7. The method of claim 6 wherein said storage device is a RAID storage device and wherein each of said segments is a logical array track and each of said groups is a logical array cylinder.

8. A multi-granular cache memory system that is located in a data path between a host computer and a storage device, said multi-granular cache memory system comprising:
   a cache memory that is logically partitioned into a first cache and a second cache; and
   a multi-granular manager for processing requests from said host computer for access to data, said multi-granular manager performing a procedure that includes:
      in response to a request from said host computer to access data, determining if said requested data is stored in said first cache and if said requested data is not stored in said first cache, determining if said requested data is stored in said second cache;
      if said requested data is not stored in said second cache, accessing a group of segments stored in said storage device, a first segment included in said group of segments including said requested data;
      storing said group of segments in said second cache and storing said first segment that includes said requested data in said first cache; and
      accessing said requested data from said first cache if in response to said request from said host computer to access data, it is determined that said requested data is stored in said first cache, or after storing said group of segments in said second cache and storing said first segment that includes said requested data in said first cache.

9. The multi-granular memory system of claim 8, wherein said procedure further comprises:
   if in response to a request from said host computer to access data it is determined that the requested data is stored in said second cache but not in said first cache, accessing in said second cache a second segment that contains said requested data and storing said second segment in said first cache; and
   accessing said requested data from said first cache after storing said second segment in said first cache.

10. The multi-granular memory system of claim 9, wherein said procedure further comprises:
   if in response to a request from said host computer to access data it is determined that the requested data is not stored in said first cache, destaging a least recently used segment from said first cache according to a least recently used procedure; and
   if in response to a request from said host computer to access data it is determined that the requested data is not stored in said second cache, destaging a least recently used group of said segments from said second cache according to a least recently used procedure.

11. The multi-granular memory system of claim 10, wherein said procedure further comprises:
   maintaining a first least recently used list for said first cache that is used when destaging a least recently used segment from said first cache according to a least recently used procedure; and
   maintaining a second least recently used list for said second cache that is used when destaging a least recently used group of said segments from said second cache according to a least recently used procedure .

12. The multi-granular memory system of claim 9, wherein said procedure further comprises:
   if said access request is a request to write a modified version of said requested data, transferring said modified version to said first cache; and
   transferring to said storage device a copy of said modified version from said first cache directly or indirectly via said second cache.

13. The multi-granular memory system of claim 12, comprising transferring to said storage device a copy of said modified version from said first cache via said second cache directly if said requested data is not in said second cache and indirectly if said requested data is in said second cache.

14. The multi-granular memory system of claim 13, wherein said storage device is a RAID storage device and wherein each of said segments is a logical array track and each of said groups is a logical array cylinder.

15. A memory medium for controlling a multi-granular cache memory system that is located in a data path between a host computer and a storage device, said cache memory system including a cache manager and a cache memory that is logically partitioned into a first cache and a second cache, said memory medium comprising:
   means for controlling said multi-granular cache memory system with a procedure that comprises:
      in response to a request from said host computer to access data, determining if said requested data is stored in said first cache and if said requested data is not stored in said first cache, determining if said requested data is stored in said second cache;
      if said requested data is not stored in said second cache, accessing a group of segments stored in said storage device, a first segment included in said group of segments including said requested data;
      storing said group of segments in said second cache and storing said first segment that includes said requested data in said first cache; and
      accessing said requested data from said first cache if in response to said request from said host computer to access data, it is determined that said requested data is stored in said first cache, or after storing said group of segments in said second cache and storing said first segment that includes said requested data in said first cache.

16. The memory medium of claim 15, wherein said procedure further comprises:
   if in response to a request from said host computer to access data it is determined that the requested data is stored in said second cache but not in said first cache, accessing in said second cache a second segment that contains said requested data and storing said second segment in said first cache; and
   accessing said requested data from said first cache after storing said second segment in said first cache.

17. The memory medium of claim 16, wherein said procedure further comprises:
   if in response to a request from said host computer to access data it is determined that the requested data is not stored in said first cache, destaging a least recently used segment from said first cache according to a least recently used procedure; and if in response to a request from said host computer to access data it is determined that the-requested data is not stored in said second cache, destaging a least recently used group of said segments from said second cache according to a least recently used procedure.

18. The memory medium of claim 17, wherein said procedure further comprises:

maintaining a first least recently used list for said first cache that is used when destaging a least recently used segment from said first cache according to a least recently used procedure; and maintaining a second least recently used list for said second cache that is used when destaging a least recently used group of said segments from said second cache according to a least recently used procedure.

19. The memory medium of claim 16, wherein said procedure further comprises:

if said access request is a request to write a modified version of said requested data, transferring said modified version to said first cache; and transferring to said storage device a copy of said modified version from said first cache directly or indirectly via said second cache.

20. The memory medium of claim 19, comprising transferring to said storage device a copy of said modified version from said first cache via said second cache directly if said requested data is not in said second cache and indirectly if said requested data is in said second cache.

21. The memory medium of claim 20, wherein said storage device is a RAID storage device and wherein each of said segments is a logical array track and each of said groups is a logical array cylinder.

* * * * *